US005860114A

United States Patent [19]
Sell

[11] Patent Number: 5,860,114
[45] Date of Patent: Jan. 12, 1999

[54] METHOD AND APPARATUS FOR MANAGING SNOOP REQUESTS USING SNOOP ADVISORY CELLS

[75] Inventor: John V. Sell, Los Altos, Calif.

[73] Assignee: CagEnt Technologies, Inc., Redwood City, Calif.

[21] Appl. No.: 942,255

[22] Filed: Oct. 1, 1997

Related U.S. Application Data

[63] Continuation of Ser. No. 780,963, Jan. 9, 1997, abandoned, which is a continuation of Ser. No. 438,550, May 10, 1995, abandoned.

[51] Int. Cl.$^6$ .................................................. G06F 12/08
[52] U.S. Cl. ........................................ 711/146; 711/145
[58] Field of Search ................................. 711/118, 141, 711/142, 143, 144, 145, 146

[56] References Cited

U.S. PATENT DOCUMENTS

| 5,072,369 | 12/1991 | Theus et al. | 711/146 |
|---|---|---|---|
| 5,325,503 | 6/1994 | Stevens et al. | 711/146 |
| 5,404,489 | 4/1995 | Woods et al. | 711/152 |
| 5,446,863 | 8/1995 | Stevens et al. | 711/100 |

OTHER PUBLICATIONS

Rhodes, Cliff, "Caches keep main memories from slowing down fast CPUs", Electronic Design, Jan. 21, 1982, U.S.A.
Strecker, William D., "Cache Memories for PDP–11 Family Computers", Computer Engineering U.S.A.
Winder, R. O. and Kaplan, K. R., "Cache–Based Computer Systems", Computer, vol. 6, No. 3, Mar. 1973, U.S.A.
IBM Microelectronics and Motorola, "PowerPC™ 603— RISC Microprocessor User's Manual" (1994), Chapters 5, 9 and 10.

Thorson, Mark, "Multiprocessor Cache Coherency— MOESI Model Describes Snooping Protocols", Microprocessor Report (Jun. 20, 1990), pp. 12–15.
Intel, "Pentium Processor User's Manual", vol. 1: Pentium Processor Data Book, pp. 3–20 to 3–21, 1993, United States.
Intel, "i486 Processor Hardware Reference Manual", pp. 6–1 to 6–11, 1990, United States.

*Primary Examiner*—Eddie P. Chan
*Assistant Examiner*—Kevin L Ellis
*Attorney, Agent, or Firm*—Fenwick & West LLP

[57] ABSTRACT

A plurality of "snoop advisory" bits are maintained by snoop management circuitry externally to the processor structure. Each snoop advisory bit corresponds to a respective "snoop advisory page" of the memory address space. Three parallel processes take place with respect to these bits. First, in response to each read access by the processor structure, if the read access is of a predetermined type (such as a cache line fill operation with intent to modify), snoop management circuitry writes a "snoop yes" value into the snoop advisory cell corresponding to the snoop advisory page which includes the address of the processor's access. Second, in response to each access by another device which shares the address space with the processor structure, a snoop request is issued to the processor structure, but only if the snoop advisory cell corresponding to the snoop advisory page which includes the address of the device's access, contains the "snoop yes" value. Otherwise, the device is allowed to perform its access directly to the memory structure without issuing a snoop request. Third, on a recurrent basis, the processor internal cache is synchronized with the memory structure and the system writes a "snoop no" value into each of the snoop advisory bits to clear them. Synchronization can involve performing a write-back on each cache line which is in a modified state, and/or invalidating each line in the cache.

44 Claims, 7 Drawing Sheets

1

METHOD AND APPARATUS FOR MANAGING SNOOP REQUESTS USING SNOOP ADVISORY CELLS

RELATED APPLICATIONS

This is a continuation of application Ser. No. 08/780,963 filed on Jan. 9, 1997, now abandoned which is a continuation of Ser. No. 08/438,550, filed on May 10, 1995, now abandoned.

BACKGROUND

1. Field of the Invention

The invention relates to cache coherency mechanisms in a multiple processor environment, and more particularly, to a mechanism for reducing the number of snoops required of a processor structure which includes a cache memory.

2. Description of Related Art

Many computer systems include at least one level of cache memory. A cache memory is a high-speed memory that is positioned between a central processing unit (CPU) and main memory in a computer system in order to improve system performance. Cache memories (or caches) store copies of portions of main memory data that are actively being used by the CPU while a program is running. Since the access time of a cache can be faster than that of main memory, the overall access time for accesses by the CPU can be reduced. Descriptions of various uses of and methods of employing caches appear in the following articles: Kaplan, "Cache-based Computer Systems," *Computer*, 3/73 at 30–36; Rhodes, "Caches Keep Main Memories From Slowing Down Fast CPUs," *Electronic Design*, Jan. 21, 1982, at 179; Strecker, "Cache Memories for PDP-11 Family Computers," in Bell, "*Computer Engineering*" (Digital Press), at 263–67, and Intel, "i486 Processor Hardware Reference Manual" (1990) at 6-1 through 6-11, all incorporated herein by reference.

Many microprocessor-based systems implement a "direct mapped" cache memory. In general, a direct mapped cache memory comprises a high speed data Random Access Memory (RAM) and a parallel high speed tag RAM. The RAM address of each line in the data cache is the same as the low-order portion of the main memory line address to which the entry corresponds, the high-order portion of the main memory address being stored in the tag RAM. Thus, if main memory is thought of as $2^m$ blocks of $2^n$ "lines" of one or more bytes each, the i'th line in the cache data RAM will be a copy of the i'th line of one of the $2^m$ blocks in main memory. The identity of the main memory block that the line came from is stored in the i'th location in the tag RAM.

When a CPU requests data from memory, the low-order portion of the line address is supplied as an address to both the cache data and cache tag RAMs. The tag for the selected cache entry is compared with the high-order portion of the CPU's address and, if it matches, then a "cache hit" is indicated and the data from the cache data RAM is enabled onto a data bus of the system. If the tag does not match the high-order portion of the CPU's address, or the tag data is invalid, then a "cache miss" is indicated and the data is fetched from main memory. It is also placed in the cache for potential future use, overwriting the previous entry. Typically, an entire line is read from main memory and placed in the cache on a cache miss, even if only a byte is requested. On a data write from the CPU, either the cache RAM or main memory or both may be updated, it being understood that flags may be necessary to indicate to one that a write has occurred in the other.

Accordingly, in a direct mapped cache, each "line" of secondary memory can be mapped to one and only one line in the cache. In a "fully associative" cache, a particular line of secondary memory may be mapped to any of the lines in the cache; in this case, in a cacheable access, all of the tags must be compared to the address in order to determine whether a cache hit or miss has occurred. "k-way set associative" cache architectures also exist which represent a compromise between direct mapped caches and fully associative caches. In a k-way set associative cache architecture, each line of secondary memory may be mapped to any of k lines in the cache. In this case, k tags must be compared to the address during a cacheable secondary memory access in order to determine whether a cache hit or miss has occurred. Caches may also be "sector buffered" or "sub-block" type caches, in which several portions of a cache data line, each with its own valid bit, correspond to a single cache tag RAM entry.

When the CPU executes instructions that modify the contents of the cache, these modifications must also be made in the main memory or the data in main memory will become "stale." There are two primary techniques for keeping the contents of the main memory consistent with that of the cache—(1) the write-through method and (2) the write-back or copy-back method. In the write-through method, on a cache write hit, data is written to the main memory immediately after or while data is written into the cache. This enables the contents of the main memory always to be valid and consistent with that of the cache. In the write-back method, on a cache write hit, the system writes data into the cache only and sets a "dirty bit" (or enters a "modified" state) which indicates that a data word has been written into the cache but not into the main memory. On a subsequent cache read miss, which requires a cache line to be replaced (filled) with new data from memory, a cache controller checks for a dirty bit before overwriting any line of data in the cache. If the dirty bit for the cache line is set, the cache controller writes the line of data out to main memory before loading the cache with new data.

A computer system can have more than one level of cache memory for a given address space. For example, in a two-level cache system, the "level one" (L1) cache is logically adjacent to the host processor. The second level (L2) cache is logically behind the first level cache, and other memory (which in this case can be referred to as tertiary memory), typically DRAM or SDRAM, is located logically behind the second level cache. When the host processor performs an access to an address in the memory address space, the first level is cache responds if possible. If the first level cache cannot respond (for example, because of an L1 cache miss), then the second level cache responds if possible. If the second level cache also cannot respond, then the access is made to the tertiary memory. The host processor does not need to know how many levels of caching are present in the system or indeed that any caching exists at all. Similarly, the first level cache does not need to know whether a second level of caching exists prior to the tertiary memory. Thus, to the CPU, the combination of both caches and tertiary memory is considered merely as a single main memory "structure". Similarly, to the L1 cache, the combination of the L2 cache and tertiary memory is considered simply as a single main memory structure. In fact, a third level (L3) of caching could be included behind the L2 cache, and the L2 cache would still consider the combination of L3 and subsequent memory as a single main memory structure.

The PowerPC™ 603 microprocessor, available from IBM and Motorola, is an example of a microprocessor which has an on-chip, two-way set associative cache memory. This cache is divided into a data cache and a separate instruction cache. The data cache on a PowerPC 603 is a write-back cache. The cache is actually programmable based on the address specified to follow a write-through or a write-back policy, but special precautions must be taken externally to the chip as long as even one line is able to follow a write-back policy as further explained below. Thus, as used herein, a "write-back cache" is a cache memory, any part of which can hold data which is inconsistent with that in the external memory subsystem.

In systems having multiple devices which share a common address space, a cache coherency protocol is implemented in order to provide the same image of memory to all such devices. Such a protocol allows synchronization and cooperative use of shared resources. Otherwise, multiple copies of a memory location, some containing stale values, could exist in a system and errors could result. One popular write-back cache coherency protocol is known as the MESI (modified/exclusive/shared/invalid) protocol. The MESI protocol is described in "Intel, Pentium Processor User's Manual", Vol. 1: "Pentium Processor Databook" (1993), incorporated herein by reference, especially at pp. 3-20 through 3-21. A superset of the MESI protocol, known as MOESI, is described in Thorson, "Multiprocessor Cache Coherency", Microprocessor Report, pp. 12–15 (Jun. 20, 1990), also incorporated by reference. In the MESI protocol, each cache data line is accompanied by a pair of bits which indicate the status of the line. Specifically, if a line is in state M, then it is "modified" (has been written to since it was retrieved from main memory). An M-state line can be accessed (read or written) by the CPU without sending a cycle out on an external bus to higher levels of the memory subsystem.

If a cache line is in state E ("exclusive"), then it is not "modified" (i.e. it contains the same data as subsequent levels of the memory subsystem). In shared cache systems, state E also indicates that the cache line is available in only one of the caches. The CPU can access (read or write) an E-state line without generating a bus cycle to higher levels of the memory subsystem, but when the CPU performs a write access to an E-state line, the line then becomes "modified" (state M).

A line in state S ("shared") may exist in more than one cache. A read access by the CPU to an S-state line will not generate bus activity, but a write access to an S-state line will cause a write-through cycle to higher levels of the memory subsystem in order to permit the sharing cache to potentially invalidate its own corresponding line. The write will also update the data in the data cache line.

A line in state I is invalid. It is not available in the cache. A read access by the CPU to an I-state line will generate a "cache miss" and may cause the cache to execute a line fill (fetch the entire line into the cache from higher levels of the memory subsystem). A write access by the CPU to an I-state line will cause the cache to execute a write-through cycle to higher levels of the memory subsystem.

The PowerPC 603 implements a cache coherency protocol which is a coherent subset of the MESI protocol omitting the shared (S) state. Since data cannot be shared, the PowerPC signals all cache line fills as if they were cache write misses (reads with intent to modify), thereby flushing the corresponding copies of the data in all caches external to the PowerPC prior to the PowerPC's cache line fill operation. Following the cache line fill, the PowerPC is the exclusive owner of the data and may write to it without a bus broadcast transaction (state E).

Computer system cache memories typically cache main memory data for the CPU. If the cache uses a write-back protocol, then frequently the cache memory will contain more current data than the corresponding lines in main memory. This poses a problem for other devices which share the same address space in the memory, because these devices do not know whether the main memory version is the most current version of the data. Similarly, for both write-back and write-through caches, even if the data in the cache is not modified with respect to that in memory, the CPU must be kept informed of write accesses to memory by external devices. Otherwise, the CPU would not know whether the cached version is the most current copy of the data. Cache controllers, therefore, typically support inquire cycles (also known as snoop cycles), in which a device essentially asks the cache memory to indicate whether it has a more current copy of the data.

In PowerPC-based systems, a device issues a snoop cycle by driving the snoop address onto the CPU bus and asserting the processor's $\overline{TS}$ and $\overline{GBL}$ control signals. The processor responds by asserting its $\overline{ARTRY}$ output if the specified data line is present in the internal cache and the specified cache line is in the M (modified) state. (If the specified data line is present in the internal cache but it is unmodified (state E), then the processor merely invalidates the line in the cache. Similarly, if the specified data line is present in the internal cache but the snoop cycle is for a write access to the entire line, then the processor merely invalidates the line in the cache. In either case, $\overline{ARTRY}$ is not asserted.) Thus, $\overline{ARTRY}$, when asserted, indicates that the internal cache contains a more current copy of the data than is in main memory. The processor then automatically conducts a write-back cycle while the external device waits. By this process, therefore, the external device will be able to access the desired line in main memory without any further concern that the processor's internal cache contains a more current copy of the data.

The time required to perform the snoop cycle, however, is significant. This is a problem not only because of the CPU bus bandwidth occupied by snoop cycles, but also because of the delays they impose on memory accesses by the external device. In systems in which the external devices are performance-critical, such as in graphics coprocessor arrangements, the need to snoop every memory access can substantially impact performance.

One technique that has been used in the past to minimize the number of snoops required by an external device, is simply to designate parts of the memory address space as being dedicated to the external device. For example, in systems having a graphics coprocessor, an area of the memory address space may be designated the frame buffer and dedicated to the coprocessor. The coprocessor never needs to snoop the CPU's cache because only the coprocessor, and not the CPU, can read or write to the frame buffer. But this solution greatly limits the flexibility of the system: it may be most desirable, for example, for the CPU to render some parts of an image while the coprocessor renders other parts of the same image. Dedicating the frame buffer to the coprocessor precludes such flexibility. Moreover, this solution avoids the question of how to minimize snoops when an external device accesses shared regions of the memory address space; dedicating an area of memory exclusively to the external device renders it no longer shared.

Another technique to minimize snoops of a processor's internal cache, has been used only on high-end systems which include a second-level (L2) cache extend to the processor. Specifically, the system enforces a rule that data cannot be cached in the processor's internal cache, unless it is also cached in the L2 cache. In such a system, the external device first snoops the L2 cache, and then snoops the processor's internal cache only if there is an L2 cache hit. The device does not need to snoop the processor's internal cache if there is an L2 cache miss. But this solution is expensive in that it requires a second-level cache external to the processor.

Accordingly, a definite need continues to exist for an alternative mechanism for reducing the number of snoop cycles required to a processor structure having an internal cache memory.

SUMMARY OF THE INVENTION

According to the invention, roughly described, a plurality of "snoop advisory" bits are maintained by snoop management circuitry externally to the processor structure. Each snoop advisory bit corresponds to a respective "snoop advisory page" (e.g. 16 k or 32 k bytes) of the memory address space. Three parallel processes take place with respect to these bits. First, in response to each read access by the processor structure, if the read access is of a predetermined type (such as a cache line fill operation with intent to modify), the snoop management circuitry writes a "snoop yes" value into the snoop advisory cell corresponding to the snoop advisory page which includes the address of the processor's access. Second, in response to each access by another device which shares the address space with the processor structure, the snoop management circuitry issues a snoop request to the processor structure if the snoop advisory cell corresponding to the snoop advisory page which includes the address of the device's access, contains the "snoop yes" value. If it does not contain the "snoop yes" value, the device is allowed to perform its access directly to the memory structure without issuing a snoop request. Third, on a recurrent basis, the processor internal cache is synchronized with the memory structure and the system writes a "snoop no" value into each of the snoop advisory bits to clear them. Synchronization can involve performing a writeback on each cache line which is in a modified state, and/or invalidating each line in the cache.

Although the invention is described herein with respect to a PowerPC-based system, its usefulness is not limited to such systems. The invention is useful whenever a cache is present which can use a write-back protocol, and which supports snoop cycles. The invention is useful also for write-through caches, although the performance advantage of the invention typically would apply only for write accesses by the external devices. Read accesses do not require snooping of a write-through cache even in conventional systems, in most cases, so a mechanism to minimize snoops would not produce any performance advantage for read accesses. However, in graphics systems, a graphics coprocessor typically performs many more write accesses than read accesses.

Viewed another way, it is known that write-back caches have many performance advantages relative to writethrough caches for many kinds of code. But the data coherency problem partially handicaps these advantages when multiple processors share a common memory space. The invention makes write-back caches more practical in such system by reducing the requirements for snooping.

BRIEF DESCRIPTION OF THE DRAWINGS

The invention will be described with respect to particular embodiments thereof, and reference will be made to the drawings, in which.

DETAILED DESCRIPTION

I. HARDWARE OVERVIEW

Figure 1:
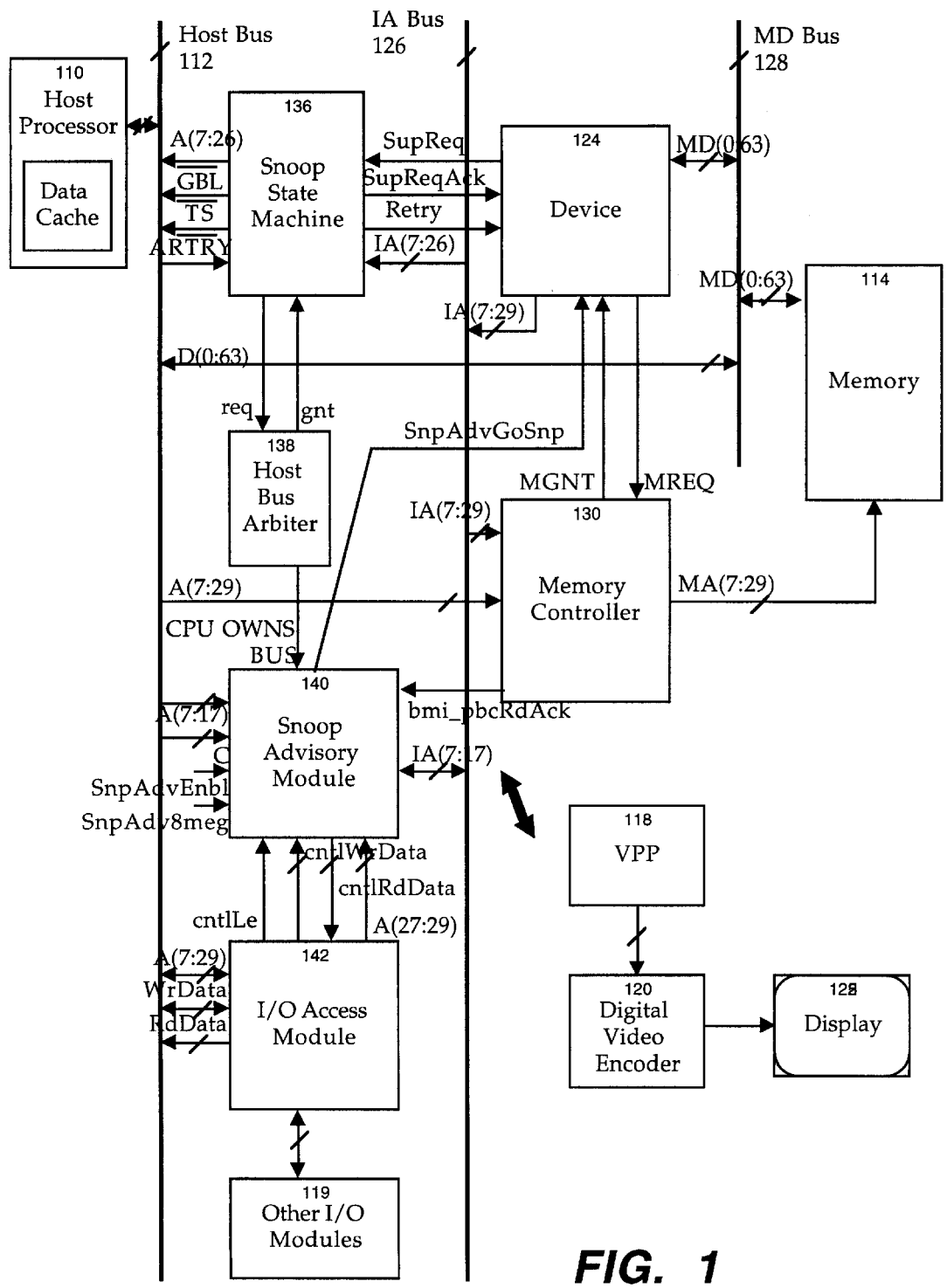
FIG. 1 is an overall block diagram illustrating pertinent features of a computer system incorporating the invention.

FIG. 1 is a simplified overall block diagram illustrating pertinent features of a computer system incorporating the invention. The system includes a processor structure 110 which may be one of the PowerPC series of RISC microprocessors available from IBM Microelectronics or Motorola. Except as mentioned herein, the processor 110 is the same, in all pertinent respects, as the PowerPC 603 described in IBM Microelectronics and Motorola "PowerPC 603 RISC Microprocessor's User Manual" (1994), incorporated by reference herein in its entirety.

The host processor 110 has a multiplexed set of I/O pins, which in one phase carry 64 bits of data and in another phase carry 32 address bits plus control signals. The multiplexed nature of these I/O pins is unimportant to an understanding of the invention, and in a different embodiment, the host processor 110 can have dedicated address, data and control leads, such as in the PowerPC 603. Since the multiplexed nature of the I/O leads on the host processor 110 is unimportant for an understanding of the invention, the description herein is simplified by assuming separate dedicated data, address and control leads.

The data, address and control leads of the processor 110 are connected to respective leads on a host bus 112 which is external to the host processor 110. The system also includes a memory 114 and an ASIC 116, both of which are external to the processor 110. The memory can be of any type, including combinations of different types. It can, for example, incude DRAM, SDPAM, SGRAM, etc. Memory 114 is essentially opaque for the purposes of the present embodiment, and other memory structures may be included as well. For example, a second-level cache may be included in the memory structure. Also, as is well known, while the memory address space is contiguous in the system of FIG. 1, physical memory location storage need not be present or contiguous in the memory structure for all of the memory locations in that address space. Storage for some addresses, for example, may be held in a ROM (not shown).

The ASIC 116 includes a number of devices which share memory 114 with the processor 110, including a triangle engine, a digital signal processor, an MPEG decoder and a video output processor ("VPP"). The VPP is illustrated in FIG. 1 as 118. It produces a digital video output stream in response to data in an image buffer in memory 114, and provides the stream to a digital video encoder (DVE) 120. The output of DVE 120 is connected to a video display 122. If the display 122 is a television set, then the DVE output signal can be in the form of NTSC or PAL video. Software executing in the host processor 110 causes the VPP 118 to refresh the display 122 at the appropriate refresh rate which, for a field of NTSC video, occurs every ⅟60 seconds.

Several of the devices in the ASIC 116 which share memory 114 with the host processor 110 operate in a similar manner with respect to the present invention. A typical one of these devices is illustrated in FIG. 1 as 124.

The device 124 has an address bus output connected to bits 7:29 of an internal address (IA) bus 126 internal to the ASIC 116. It also has what, for the purposes of the present invention, can be considered to be a 64-bit wide data port connected to a 64-bit memory data (MD) bus 128, which is also connected to memory 114. The MD bus 128 is further coupled bi-directionally to the 64-bit data portion of the host bus 112 via tristate buffers (not shown).

Bits 7:29 of the IA bus 126 are provided to an address input port of a memory controller 130 on the ASIC 116, which also receives address bits 7:29 from the host bus 112. The memory controller 130, which performs memory arbitration services for the devices 124 and the processor 110, has a memory address (MA) output port connected to the address leads of memory 114. The address port of memory 114 actually carries multiplexed row and column addresses, but a non-multiplexed interface is illustrated in FIG. 1 for simplicity.

The device 124 further has a memory request (MREQ) output signal 132 which is connected to an input of the memory controller 130, for memory arbitration. The memory controller 130 in turn has a memory grant (MGNT) output signal 134 which is connected back to the device 124. The device 124 also has a snoop request output snpReq connected to a snoop state machine 136, which also receives bits 7:26 (sufficient to specify a cache line address for the processor 110's internal cache) from the IA bus 126. Snoop state machine 136 has a snoop request acknowledge output snpReqAck which is connected back to the device 124. The snoop state machine 136 also has a RETRY output which is connected back to device 124.

The snoop state machine 136 is the unit on the ASIC 116 which issues snoop cycles to the host processor 110. It provides a cache line address (bits 7:26) to the address leads of the host bus 112 via three-state buffers (not shown). The snoop state machine 136 is also connected to the $\overline{\text{GBL}}$ and $\overline{\text{TS}}$ control signals on host bus 112, and monitors the $\overline{\text{ARTRY}}$ control signal on the host bus 112.

Control of the host bus 112 is arbitrated by a host bus arbiter 138, also on the ASIC 116. It receives a request (req) signal from the snoop state machine 136, and at an appropriate time, returns a grant signal (gnt) to the snoop state machine 136.

The ASIC 116 also includes a snoop advisory module 140, the purpose of which is to advise devices such as 124 whether a snoop of the processor 110 internal cache should be issued for the address of a particular access to the memory 114 which the device desires to perform. The snoop advisory module 140 is coupled to receive bits 7:17 (sufficient to specify a "snoop advisory page address", for pages of minimum configurable size) of the IA bus 126. It also receives a timing signal bmi_pbcRdAck from the memory controller 130 indicating when the data requested by the processor 110 is actually being read from the memory 114. The snoop advisory module 140 is also coupled to receive bits 7:17 from the address leads of the host bus 112, as well as a number of control signals C.

The ASIC 116 also includes an I/O access module 142, which is coupled to receive bits 7:29 from the address leads of the host bus 112. It is also coupled bi-directionally with the 64-bit data leads of the host bus 112, via lines shown separately in FIG. 1 as write data lines (WrData) and read data lines (RdData). The I/O access module 142 handles accesses from the host 110 to the I/O control space, mainly implemented in the form of individual control registers in the various functional units of the ASIC 116. In addition to being coupled to a number of other I/O modules 144, the I/O access module 142 also provides to the snoop advisory module 140 a number of signals including bits 27:29 of the host bus 112 address leads, a latch enable signal cntlLe, and a write data bus cntlWrData. It also receives a control read data bus cntlRdData from the snoop advisory module 140.

Figure 7:
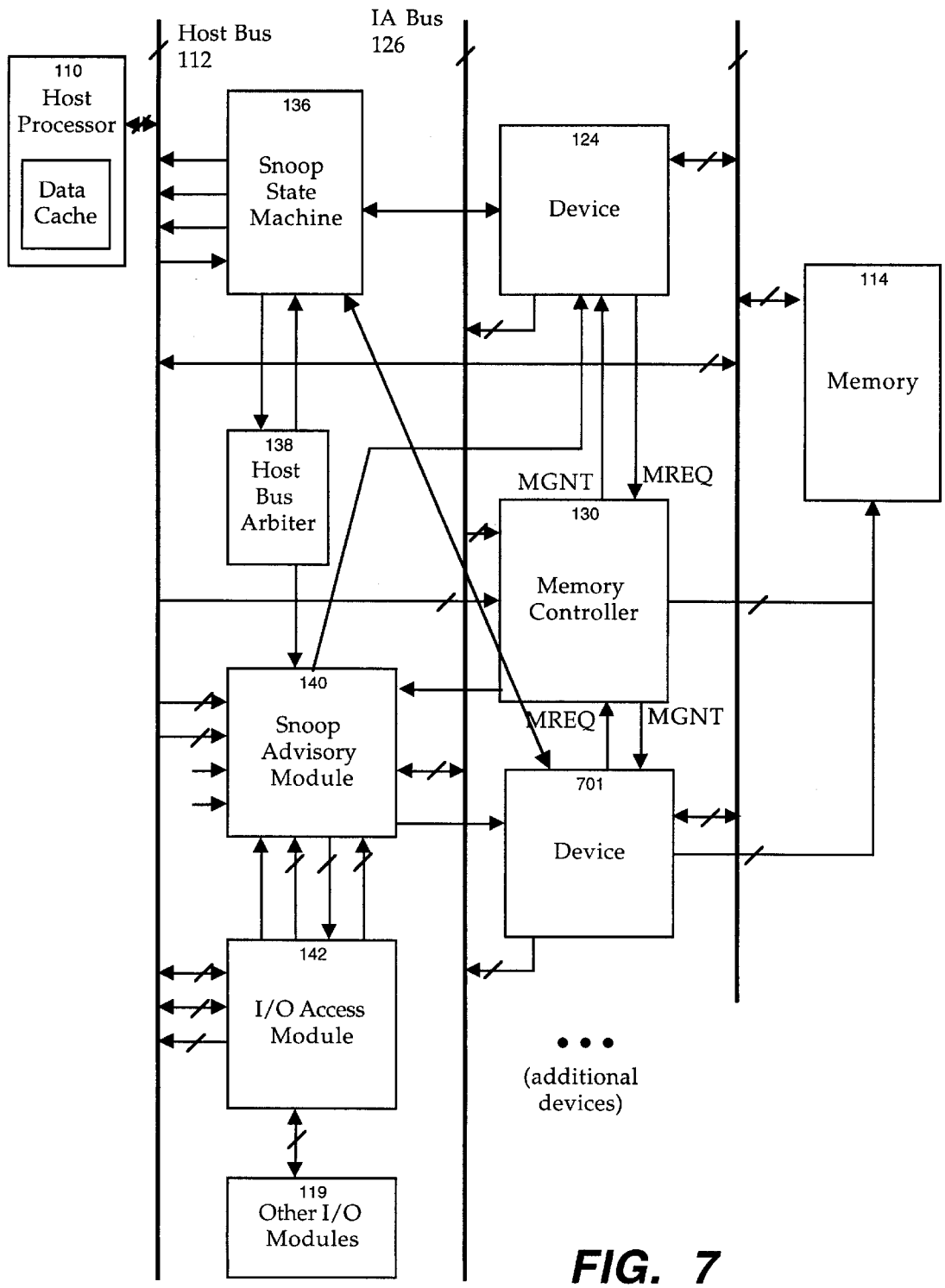
FIG. 7 is a simplified overall block diagram illustrating pertinent features of a computer system incorporating the invention, with additional devices.

The host processor 110 can enable or disable snoop advising by the snoop advisory module 140, by programming a snpAdvEnbl bit in a register bit (not shown) accessible via the I/O access module 142. Additionally, the snoop advisory module 140 can be configured to provide snoop advising services for either a four megabyte address space or an eight megabyte address space of the memory 114. The host 110 makes this selection by programming a snpAdv8meg bit in a register (not shown) accessible via the I/O access module 142. Finally, when the snoop advisory module 140 determines whether a snoop of a particular cache line address is appropriate, it outputs a snpAdvGoSnp signal, either asserted or negated at a predetermined time, back to the device 124. FIG. 7 is a simplified block diagram, similar to FIG. 1, but showing additional device 701 connected and operating in similar manner as device 124.

Several of the individual functional units in the system of FIG. 1 will now be described in more detail.

A. Host Processor

Figure 2:
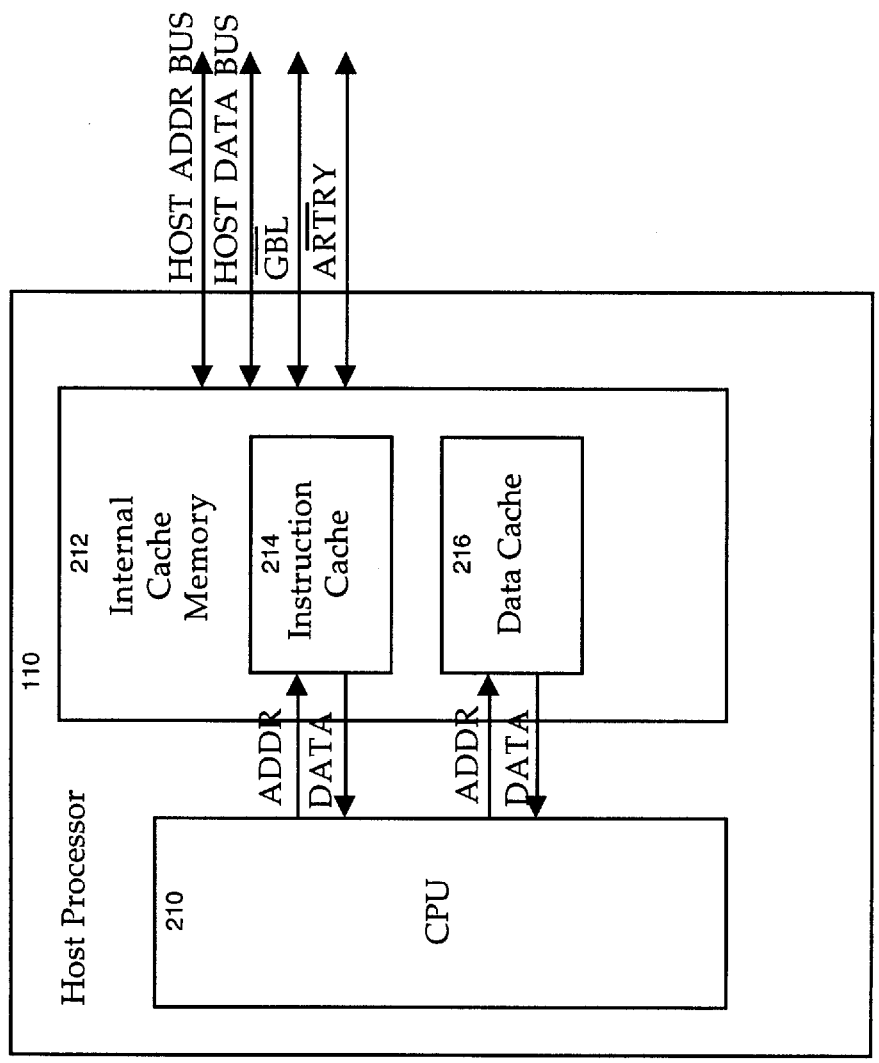
FIG. 2 is a block diagram of pertinent parts of the host processor of FIG. 1.

FIG. 2 is a block diagram of pertinent parts of the host processor 110. It comprises a CPU 210 which communicates with an internal cache 212. The internal cache 212 contains separate instruction and data caches 214 and 216, respectively. The internal cache 212 communicates with the address and data lines of host bus 112, as well as several of the control lines of host bus 112. Two of the control lines are shown specifically in FIG. 2, namely, $\overline{\text{GBL}}$ and $\overline{\text{ARTRY}}$. The internal cache 212 caches data in a main memory address space for the CPU 210. Although the internal cache 212 and the CPU 210 are both fabricated together on a single chip in the host processor 110, in a different embodiment they may occupy two or more chips.

More particularly, note that different embodiments of the invention can have a wide variety of different kinds of host processors 110. For example, they can include a "level 0" cache between the CPU and the "internal" cache 212; they can include one or multiple processors; they can include bridges between the host bus 112 and a bus protocol expected by a CPU 210, and so on. As a group, however, all the components of the host processor use internal cache 212 to cache at least some lines of the memory address space. Because of the possibility of these variations, the host processor 110 is sometimes referred to herein as a "processor structure".

Returning to the embodiment of FIG. 2, the instruction cache and data cache each have a 32-byte line size and are two-way set associative. Each is 4 k bytes long. The data cache is configurable at a page and line level for cacheability, write-back or write-through policy, and memory coherency. (A cache line is the unit of memory at which coherency is maintained.)

The data cache 216 is configured as 64 sets of two lines each. Each entry includes the 32-byte cache data line, two state bits and an address tag. The two state bits implement the MEI cache coherency protocol described above. The instruction cache also is configured as 64 sets of two lines each, and each entry includes the 32-byte cache data line, an address tag and a valid bit. It does not implement the modified state (state M) of the MEI protocol. Only a line fill operation on a cache read miss can write data into the instruction cache. The instruction cache is not snooped, and cache coherency must be maintained by software.

On a cache miss, the host processor 110 performs line fills in four beats of 64 bits each. The burst fill is performed as a "critical-double-word-first" operation.

As bus operations are performed on the host bus 112 by other bus masters, the bus snooping logic of the host processor 110 monitors the addresses that are referenced. If $\overline{GBL}$ is asserted in the same clock cycle as $\overline{TS}$ is asserted, the processor's bus snooping logic compares the address with those resident in the data cache tag RAM. If there is a snoop hit, and the cache data line is in the modified state (state M), then the processor's bus snooping logic asserts its $\overline{ARTRY}$ output at a predetermined time. The processor also automatically performs a "cache push" to write back the referenced cache data line to memory, and invalidates that cache line (state I). If the referenced cache line is in the exclusive state (state E), then the processor 110 merely marks the cache line as invalid (state I). $\overline{ARTRY}$ is not asserted. The same is true if the snoop cycle is for writing to the entire line.

(In an embodiment in which the processor uses the full MESI cache coherency protocol, if the device 124's desired access is a read access and not a write access, and the referenced data is cached unmodified (state E) in the processor's 110 internal cache, then the processor 110 may change the state of the cache entry to state S (shared) rather than I (invalid). The processor would not assert $\overline{ARTRY}$ (or its equivalent for that processor), but the external interface for the processor would need to include a way for the snoop state machine 136 to indicate to the host processor 110 that the device 124's access is a read access rather than a write access.)

Because the entire 32-byte cache line is affected by a snoop cycle, the snoop address omits bits 27:31. The address bits having a higher order than bit 27 are sufficient to identify a "line address". As used herein, a line address is the portion of an address necessary to uniquely identify a data unit of the size of one cache line (32 bytes for the processor 110). Similarly, a "byte address" includes all address bits since they are all needed to uniquely identify a desired byte, and, in general, a "data unit address" includes whatever address bits are required to uniquely specify a unit of memory having the number of bytes in the data unit.

Also as used herein, a line of data in secondary memory is "cached" if data identified to that line in memory is temporarily stored in a cache memory. The data stored in the cache memory can either be the same as or different from the data stored in the corresponding line of secondary memory. If the processing unit for which the cache is caching the line of data has modified the version of the data stored in the cache, then the data is referred to as "cached modified".

When the host processor 110 performs a read operation on the host bus 112, it can be either a single-beat bus transaction or a burst transaction. Single-beat bus transactions can transfer from one to eight bytes at a time, and in read operations, can occur only if caching is inhibited. Burst transactions always transfer eight words (32 bytes) at a time, and are recognizable externally by the assertion of the processor 110's $\overline{TBST}$ (transfer burst) output signal. All cache line fill operations are performed using burst transactions.

Note that the operation performed by the host processor 110 in response to a cache snoop is different from the operation performed by the host processor 110 in response to a CPU 210 access to the memory address space which results in a cache read miss or cache write miss. First, for a snoop operation, the address comes from the host bus 112, whereas for a cache miss, the address comes from the CPU 210. Second, for a snoop operation, the processor 110 asserts its $\overline{ARTRY}$ output signal if the referenced data line is cached modified in the host processor 110, whereas for a cache miss operation, the processor 110 need not assert any special signal external to the processor. Third, whereas a cache read miss results in a write-back operation on the host bus 112 (if the cache line was in the modified state) followed by a line fill operation, a snoop hit does not produce a line fill operation.

B. Snoop Advisory Module

Figure 3:
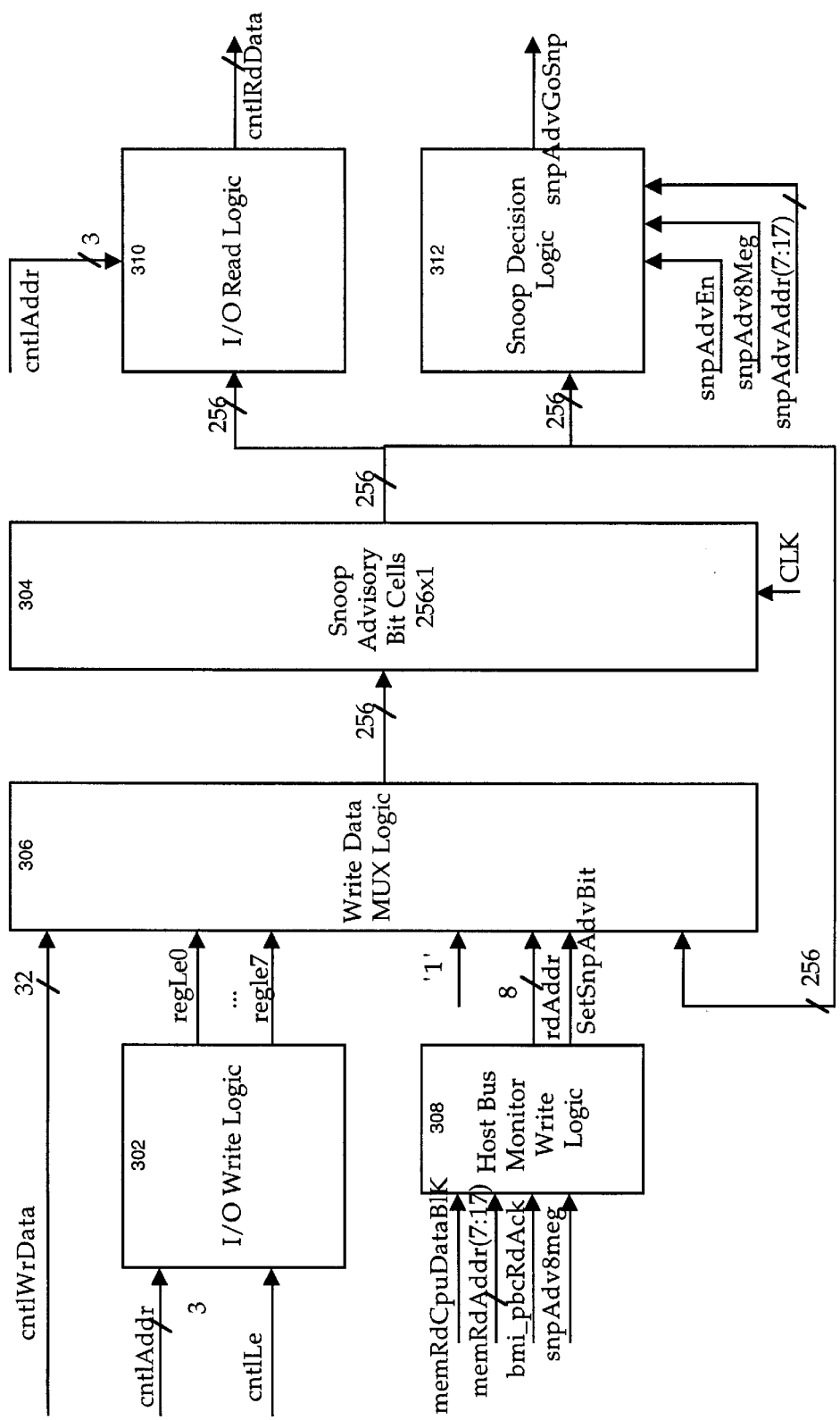
FIG. 3 is a functional block diagram of the snoop advisory module of FIG. 1.

FIG. 3 is a functional block diagram of the snoop advisory module 140 (FIG. 1). It comprises an I/O write logic block 302, for performing host processor-initiated writes into a 256×1-bit array 304 of snoop advisory bit cells. I/O address space writes appear to the ASIC 116 (FIG. 1) as normal data write operations on the host bus 112, except that the processor 110 asserts an $\overline{XATS}$ signal rather than the $\overline{TS}$ signal to signify a transfer start. I/O address space writes are detected by the I/O access module 142 (FIG. 1), which decodes the address on the host bus A(7:29) bits. If the address decodes to any of the eight word addresses assigned to snoop advisory module 140, then bits A(27:29) are provided to the snoop advisory module 140 as a cntlAddr and a 32-bit wide write data word from the host bus 112 is provided to the snoop advisory module 140 as cntlwrData. The I/O access module 142 asserts a cntlLe signal to the snoop advisory module 140 for one clock cycle.

Inside the snoop advisory module 140, cntlWrData is provided to one data input port of a write data mux logic block 306, described below. The 3-bit wide cntlAddr bus is provided to I/O write logic 302, as is the cntlLe signal. I/O write logic 302 decodes the 3-bit cntlAddr and qualifies it with cntlLe to assert one of eight latch enable signals regLe0 . . . regLe7 (collectively, regLe_) to the write data mux logic 306.

The snoop advisory module 140 also monitors read accesses from the host processor 110. The address A(7:17) of the read access is monitored to determine whether it is within a predefined subset of addresses of the memory address space which are shared by the devices 124 (FIG. 1). This subset is programmable by the processor 110, via a register in the I/O address space, to be either the first four megabytes of the memory address space or the first eight megabytes of the memory address space. A(7:17) is provided to host bus monitor write logic 308 in the snoop advisory module 140 as memRdAddr(7:17) (FIG. 3), and the selection of four or eight megabytes is provided as a snpAdv8meg signal.

The host bus monitor write logic 308 also tests processor read accesses to determine whether they are of a type which may constitute a cache line fill of a line in the data cache. That is, only cache line fill operations, for the data cache, indicate that subsequent device accesses to the same memory addresses should initiate a snoop operation; other kinds of processor read accesses, for example cache-inhibited read accesses, do not update the processor's internal cache and do not therefore require that subsequent device accesses to the same memory address initiate a snoop operation. The host processor 110, when it performs a transaction on the host bus 112, indicates the transfer type by driving five control bits TT0 . . . TT4. The meaning of these bits is described in the above-incorporated PowerPc 603 manual at pages 9-11 through 9-13. The processor 110 also drives a $\overline{\text{TBST}}$ signal to indicate whether the transfer is a burst transfer or a single-beat transfer. All cache line fill operations from the processor 110 use a transfer type TT0:4= 01110 and $\overline{\text{TBST}}$ asserted. Other bus operations from the processor 110 may also use this transfer type, but the host bus monitor write logic 308 is sure to detect at least all cache line fill operations by testing for these values.

Note that in other embodiments, the host bus monitor write logic may not be able to determine with precision whether a particular read access is a cache line fill operation. In such cases, the host bus monitor write logic 308 might, for example, test for all processor read accesses having a length which is at least as large as a line of the processor's internal cache. In general, the host bus monitor write logic 308 should determine from the signals provided by the processor whether it is possible that the read data will be written into the internal cache. This test can be overinclusive, for example if the processor does not provide sufficient signals to indicate the transaction type precisely, and for some processors may even need to include all processor read accesses. But to be safe, the test should never be underinclusive.

Logic in the ASIC 116, not shown, generates a memRd-CpuDataBlk signal for the host bus monitor write logic 308. This signal is asserted only when the transaction type is as indicated above, the source of the transaction is the host processor 110, the transaction is a burst transaction ($\overline{\text{TBST}}$ asserted), the access is a read access, and the access is for the data (as opposed to instruction) cache (processor 110 asserts transfer code TC(0:1)=00—see page 9–15 of the above-incorporated PowerPC 603 manual). This transfer type qualification is actually even narrower than TT0:4= 01110 and $\overline{\text{TBST}}$ asserted, yet it still does not underinclude.

The host bus monitor write logic 308 also receives a bmi_pbcRdAck signal from the memory controller 130 (FIG. 1). This is a timing signal indicating when the appropriate snoop advisory bit should be set, assuming all qualifications are satisfied. bmi_pbcRdAck is asserted only when the memory controller 130 has actually granted control of the line of memory 114 to the host processor 110, and no other device can supersede it.

The host bus monitor write logic 308 produces an eight-bit rdaddr, indicating which of the 256 snoop advisory bits should be set, and at the proper time asserts a setSnpAdvBit signal. These signals are provided to the write data mux logic 306, along with the logic 1 to be written into the selected bit at the selected time. Host bus monitor write logic 308 generates rdaddr as the low-order eight bits of the snoop advisory page address portion of memRdAddr. A page is 16 k bytes long if the subset of the memory address space which is subject to snoop advising is four megabytes long (snpAdv8meg=0), and is 32 k bytes long if the subset of addresses in the memory address space which is subject to snoop advising is eight megabytes long (snpAdv8meg=1). Accordingly, host bus monitor write logic 308 produces rdaddr as memRdAddr(10:17) if snpAdv8meg=0, and memRdAddr(9:16) if snpAdv8meg=1. Host bus monitor write logic 308 generates setSnpAdvBit signal according to the Boolean equation:

setSnpAdvBit=memRdCpuDataBlk·rdAddrInRange·bmi_pbcRdAck where rdAddrInRange is high only if the value of memRdAddr is within the sharable memory address range (4 megabyte for snpAdv8meg=0 or 8 megabyte for snpAdv8meg=1).

The values in the snoop advisory bit cell array 304 are updated in parallel in every clock cycle, and the purpose of write data mux logic 306 is to provide the next-state values for the snoop advisory bit cell array 304. The write data mux logic 306 has a 256-bit wide data output port, which is connected to the 256-bit wide data input port of the snoop advisory bit cell array 304. The 256-bit wide data output port of the snoop advisory bit cell array 304 is also connected back to an input port of write data mux logic 306. Most of the time this information is passed directly back to the input port of snoop advisory bit cell array 304, thereby leaving the contents of the array unchanged. However, if regLe0 from the I/O write logic 302 is asserted on a given clock cycle, the write data mux logic 306 replaces the contents of snoop advisory bits 0:31 with the value on the cntlwrData bus from the I/O access module 142 (FIG. 1). Similarly, if regLe1 is asserted on a given clock cycle, the write data mux logic 306 replaces the values in snoop advisory bits 32:63 with the value on cntlwrData. All other values in the snoop advisory bit cell array 304 remain unchanged. Thus, each regLe_ signal corresponds to a respective 32-bit segment (seen by the processor 110 as a 32-bit "register" in the I/O address space), and when asserted causes the write data mux logic to replace the contents of the selected segment with the value on cntlwrData.

If the host bus monitor write logic 308 asserts setSnpAdvBit on a given clock cycle, then the write data mux logic 306 writes a logic 1 (the "snoop yes" value) into the snoop advisory bit cell designated by rdAddr. The values in all of the snoop advisory bits which are not affected by regLe_ or setSnpAdvBit are left unchanged.

The 256-bit data output port of snoop advisory bit cell array 304, in addition to be connected back to the write data mux logic 306, is also connected to a data input port of an I/O read logic 310. I/O read logic 310 also receives the three-bit cntlAddr value from the I/O access module 142. When the processor 110 performs a read access in the I/O address space corresponding to any of the eight 32-bit segments of the snoop advisory bit cell array 304, I/O read logic 310 selects the designated 32 bits in accordance with the value on cntlAddr. The selected 32-bit wide value is provided via the cntlRdData bus back to the I/O access module 142 for return via the host bus 112 to the host processor 110. The ability to read the snoop advisory bit cell array is provided primarily for diagnostic purposes.

The 256-bit data output port of the snoop advisory bit cell array 304 is also connected to a data input port of a snoop decision logic 312. Snoop decision logic 312 also receives the snpAdvEn signal (indicating whether snoop advising is enabled) and the snpAdv8meg signal. Snoop decision logic 312 also receives the page portion of the address provided by a device 124 (FIG. 1), appearing in the snoop advisory module 140 as snpAdvAddr(7:17). Snoop decision logic 312 generates the snpAdvGoSnp signal back to the device 124 in accordance with the Boolean equation:

snpAdvGoSnp=!snpAdvEnbl+!snpAddrInRange+snpAdvBit(snpAddr), where
snpAddrInRange is high only if the value of snpAdvAddr is within the sharable memory address range (4 megabyte for snpAdv8meg=0 or 8 megabyte for snpAdv8meg=1);
snpAdvBit(snpAddr) is the value of the snoop advisory bit designated by snpAddr in the snoop advisory bit cell array 304;
snpAddr is snpAdvAddr(10:17) if snpAdv8meg=0, or snpAdvAddr(9:16) if snpAdv8meg=1; and
! indicates logical negation.

II. SYSTEM OPERATION

In order to implement snoop advising, three processes are performed on the snoop advisory bit cell array 304 (FIG. 3) in parallel. First, the ASIC 116 monitors the activity on the host bus 112, and whenever it detects a transaction that might constitute a cache line fill, it writes a logic 1 into the snoop advisory bit cell corresponding to the snoop advisory "page" within which the address was located. A logic one in the snoop advisory cells is referred to sometimes herein as a "snoop yes" value, whereas in logic 0 it is referred to sometimes herein as a "snoop no" value. The values corresponding to "snoop yes" and "snoop no" could, of course, be different in a different embodiment. Also in a different embodiment, each snoop advisory cell could contain more than one bit and could contain additional information.

The second process that takes place with respect to the snoop advisory bits is that whenever the devices 124 access an address in memory space shared with the host processor 110, the snoop advisory module 140 indicates to the device whether a snoop cycle to the host processor 110 can safely be avoided. If not, the device 124 then initiates such a snoop cycle.

If the above two processes were left to operate alone, then the host processor monitoring process would eventually set all of the snoop advisory bits with the "snoop yes" value and the device 124 would always be told that a snoop cycle cannot be avoided. The third process, therefore, recurrently clears (writes "snoop no" values into) the snoop advisory bits in conjunction with data synchronization of the corresponding cache data line entries.

The host processor monitoring process used in the system of FIG. 1 has been described in detail above. The snoop decision process and the snoop advisory bit clearing process are described below.

A. Snoop Decision Process

Figure 4:
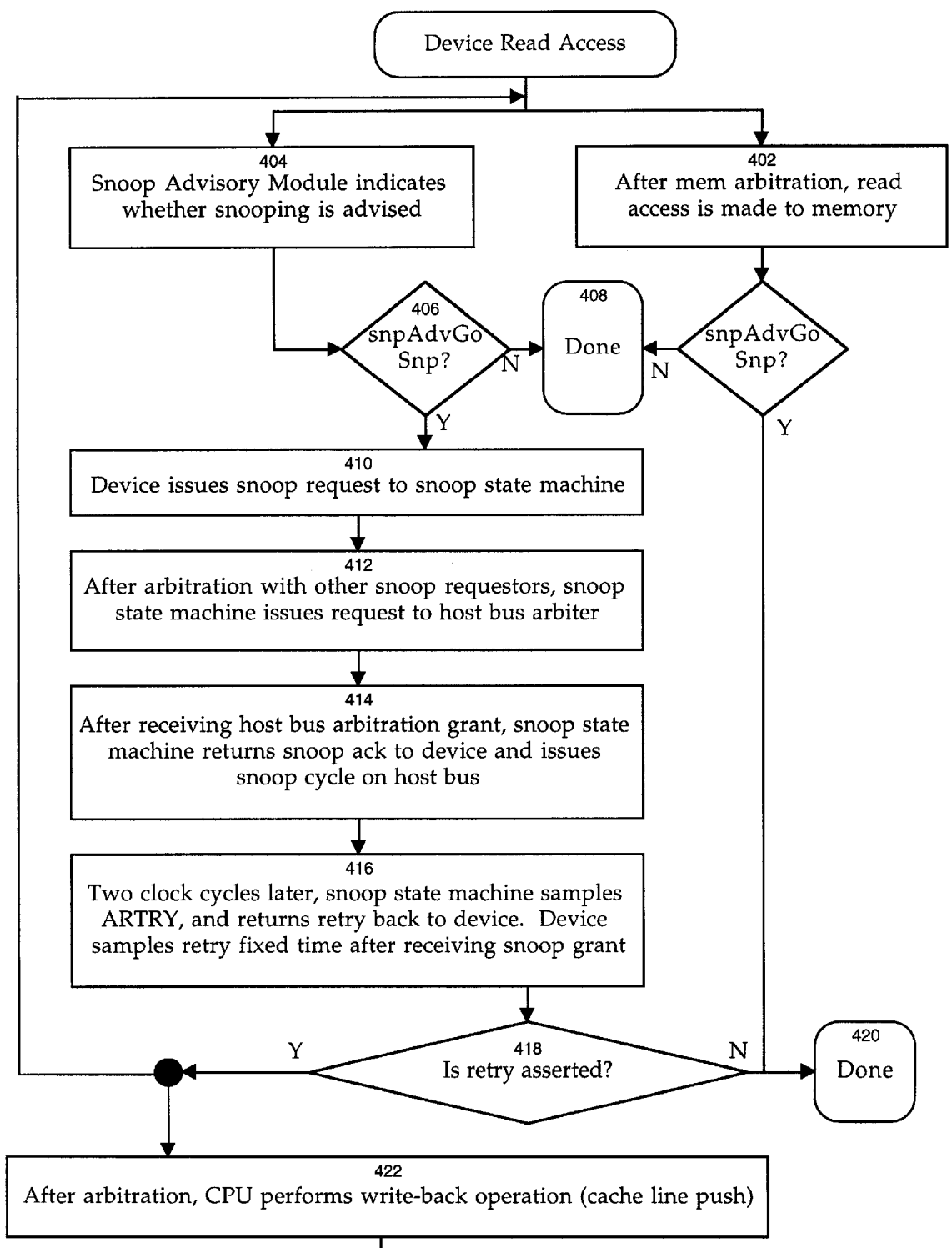
FIG. 4 is a flow chart of the steps performed by the circuitry of FIG. 1 when a device issues a read access request.

FIG. 4 is a flow chart of the steps performed by the circuitry of FIG. 1 when a device 124 issues a read access request. Initially, the device 124 arbitrates for control of the memory 114 in the memory controller 130 by asserting an MREQ signal to the memory controller 130. After arbitration, the memory controller 130 returns MGNT to the device 124, and the device 124 drives the word address for the read access onto IA(7:29). The requested data is returned to the device 124 from memory 114 via MD bus 128 (step 402).

At the same time, when the device drives the read address onto IA bus 126, snoop advisory module 140 receives the snoop advisory page address IA(7:17). Through snoop decision logic 312 (FIG. 3), the snoop advisory module 140 returns snpAdvGoSnp to the device 124 (step 404).

If snpAdvGoSnp was negated (steps 406 and 407), then the device 124 does not initiate a snoop of the host processor 110, and the data, when eventually returned from the memory, 114 is considered valid (step 408). If snpAdvGoSnp was returned asserted, then the device issues a snoop request snpReq to the snoop state machine 136 (step 410). When the data is eventually received from memory, it is retained for the purposes described below.

After arbitration with other snoop requesters, the snoop state machine 136 issues a request req to the host bus arbiter 138 for control of the host bus 112 (step 412). After arbitration, the host bus arbiter 138 returns grant to the snoop state machine 136, and the snoop state machine 136 returns a snoop request acknowledge signal snpRepAck to the device 124. The snoop state machine 136 also at this time issues the snoop cycle on the host bus 112, by driving the cache line address IA(7:26) on to the address lines of the host bus by asserting $\overline{TS}$ and $\overline{GBL}$ (step 414).

In step 416, two clock cycles later, the host processor returns $\overline{ARTRY}$ either asserted or negated. The snoop state machine returns Retry to the device 124. The device 124 samples Retry at a fixed time after having received snpReqAck.

In step 418, if Retry was negated, then there is no conflict between the memory and the cache, and the data that was obtained from memory 114 is considered valid (step 420). If Retry was asserted, then the device 124 aborts and starts again with its read access.

In step 422, after asserting $\overline{ARTRY}$, the host processor 110 automatically arbitrates for the host bus 112 and memory 114 in order to perform a cache line push (write-back) operation for the referenced cache line. At this point the host processor 110 has a higher priority in these arbitrations than does the device 124, so the host processor 110 will typically be able to complete the write-back operation before the next attempt of the device 124 to read the data. Eventually, after the write-back is complete, the memory controller 130 will grant the device 124 access to the memory 114 (step 402). The snoop advisory module 140 will typically still advise snooping (step 406), but since the referenced cache line is no longer cached modified in the host processor 110, $\overline{ARTRY}$ and hence Retry will be returned to the device 124 unasserted (step 418). The device 124 will know at this point that the data obtained from memory 114 is valid, and can proceed with further operations.

A device write access to shared memory operates in a manner similar to a read access. Specifically, the device writes the data to memory 114 concurrently with analysis by the snoop advisory module. If a full 32-byte line was written, then the memory operation is complete because even if there is a snoop hit, no write-back will take place. If less than a full 32-byte line was written, and the processor returns $\overline{ARTRY}$, then the device repeats its write to memory 114 after the processor's write-back operation completes.

B. Snoop Advisory Bit Clearing Process

As the operation of the system of FIG. 1 proceeds, and the host processor 110 makes more cache line fill accesses to cache lines in different snoop advisory pages of the memory 114, the host processor monitoring process will eventually fill all of the snoop advisory bit cells with the "snoop yes" value. Therefore, the embodiment described herein clears the snoop advisory bits on a recurrent basis. It is not necessary that snoop advisory bit clearing take place at regular intervals (periodically), only that they take place recurrently. It is also not necessary that they all be cleared at the same time, or that they all be cleared at the same periodic rate, or that the intervals at which different ones of these bits are cleared be related to each other in any manner at all. However, they should be cleared only in conjunction with a data synchronization with memory 114 of all cache lines which are affected. In the present embodiment, such data synchronization involves a write-back (if modified) and invalidation of all cache lines in the data cache 216 (FIG. 2) which contain data from the snoop advisory page corresponding to the particular snoop advisory bit to be cleared.

The interval at which the snoop advisory bit clearing process clears snoop advisory bits, in an abstract sense, is a tradeoff between the amount of time necessary to perform any necessary cache line write-back operations and the reduction, as the host processor monitoring process sets more and more of the snoop advisory bits, of the performance gain obtained through the use of snoop advisory bits. However, in many practical systems, a favorable time to clear the advisory bits is when a major reallocation occurs in the use of areas of memory, or when major changes occur in the set of CPU processes which are active. In the system of FIG. 1, both of these happen most often at the vertical retrace time of the display 122. At this time the frame buffers usually switch, and operating system Kernel software executing in the host processor 110 needs to reprogram the VPP 118 (FIG. 1). Thus, the snoop advisory bit clearing process is performed in the present embodiment according to software executing in the host processor 110, as part of the interrupt code of the operating system kernel which executes in conjunction with every vertical retrace of the display 122. Placing the snoop advisory bit clearing process software here provides the additional advantage that, since it is already part of an interrupt procedure, it cannot itself be interrupted. Thus for an NTSC display 122, the snoop advisory bits are cleared every 1/60 of a second, or every 16.6 milliseconds.

Figure 5:
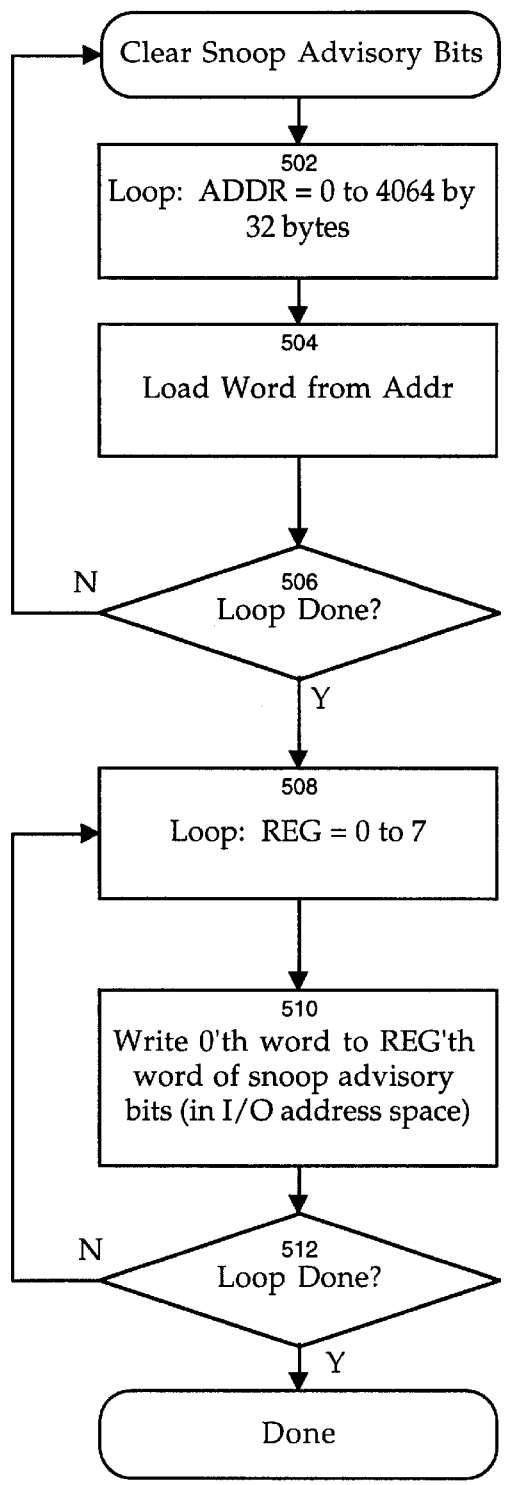
FIG. 5 is a flow chart of a routine which clears the snoop advisory bits in FIG. 1.
Figure 6:
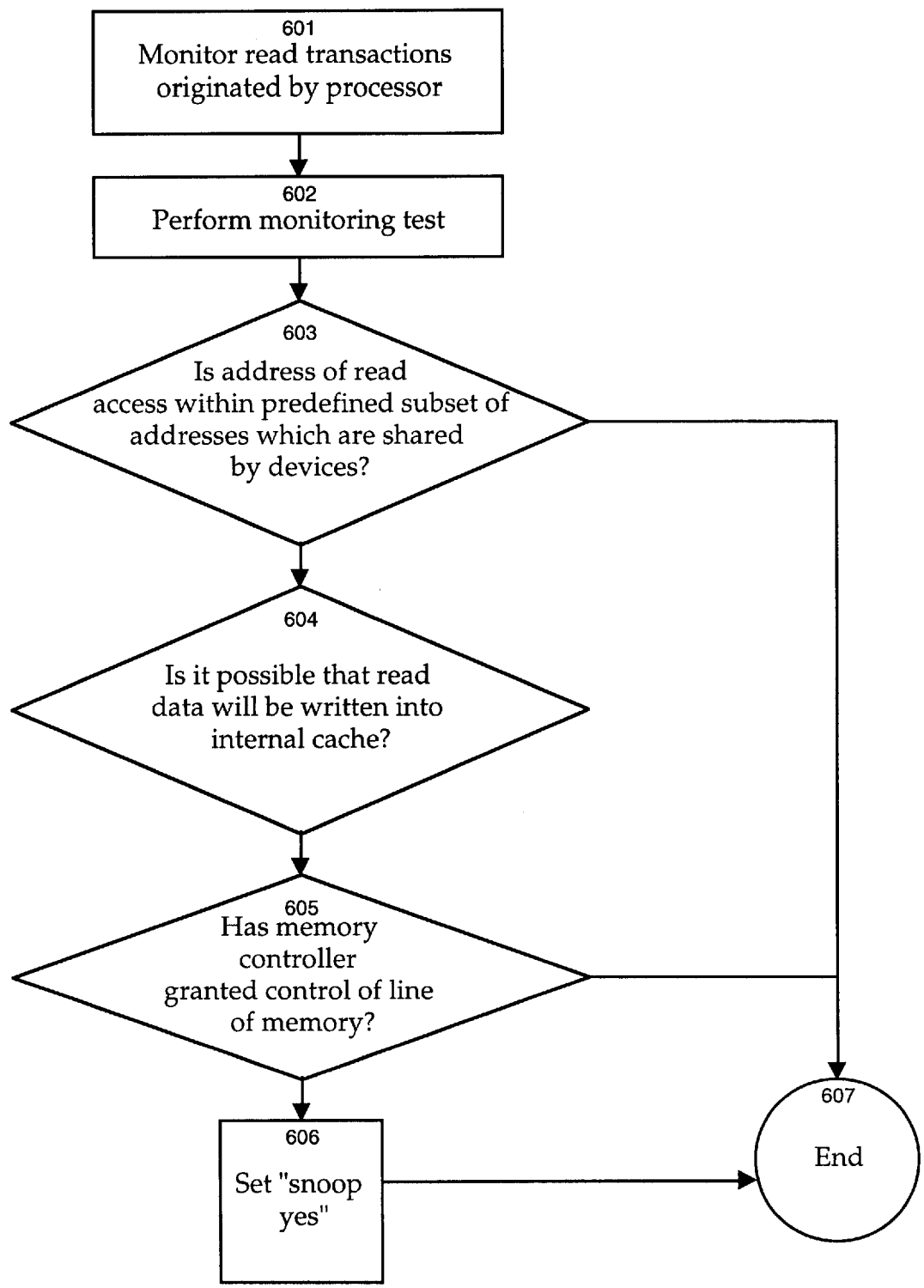
FIG. 6 is a flow chart of a method of monitoring transactions and setting snoop advisory values.

FIG. 5 is flow chart of the routine which clears the snoop advisory bits on every vertical retrace of the display 122. In a step 502, the routine begins a loop through the lowest 4096 bytes of the memory address space, incrementing by 32 bytes each iteration. This lowest 4 k bytes of main memory address space is chosen because the CPU never writes to this region during normal operation of the system, and because it is predetermined that none of the other devices that share memory address space with the host processor 110 ever write to addresses within this range.

In step 504, the routine loads a word from the current address. Usually, such a load operation will produce a data cache read miss, resulting in a write-back operation (if the entry was modified) and a line fill operation. If the load instruction does not produce a cache read miss condition, then it is because the cache already contains the data for the specified address. In either case, the corresponding data cache entry is now guaranteed to map to an entry in the low 4 k bytes of memory 114. Additionally, since the CPU never writes to this region, even if the load instruction produced a cache read hit, the data in the cache entry is guaranteed to be unmodified. (Note that in a different embodiment, in which the CPU does write to this region, unmodified data can be guaranteed by forcing all CPU write accesses to this region to use a write-through protocol.) Note that the first half of the iterations through the loop 502 (addresses 0 to 2k) makes a single traversal through all 64 sets in the data cache 216 (FIG. 2), affecting only one of the two cache data lines in each set. But since the internal cache memory 212 uses a least-recently-used (LRU) replacement policy for its caches, the second half of the iterations of loop 502, which traverse the data cache sets a second time, always affect the other cache data line in each set. Accordingly, by the time all iterations of the loop complete, it is guaranteed that all entries in the data cache are mapped to addresses in the lowest 4 k of memory address space. Further, since none of the entries in the data cache contain dirty data, it is guaranteed that none of the devices will retrieve stale data by reading data from the memory in this address range. Moreover, since none of the devices 124 (FIG. 1) ever writes data to addresses within this address range, it is also guaranteed that none of the devices will improperly write data into an address in memory 114 which is currently cached in the processor 110.

Alternatively, either the software or the hardware can require that the snoop advisory bit or bits corresponding to the snoop advisory page or pages containing any of these addresses, always contain the "snoop yes" value. For example, if the lowest 4 k bytes of memory address space are traversed in the loop, as shown in FIG. 5, then the hardware or the software can ensure that bit 0 of the snoop advisory bit cell array 304 (FIG. 3) is always set to 1.

Returning to FIG. 5, after the referenced word is loaded from memory 114 in step 504, step 506 determines whether the loop has completed yet. If not, then it repeats back to step 502.

If the loop 502 has completed, then in step 508, the routine begins another loop through the eight 32-bit "registers" of snoop advisory bit cells, as seen by the host processor 110. In step 510, the routine writes a word of all zeroes to the current register in the I/O address space, and step 512 determines whether the loop has yet completed. If not, then the next iteration proceeds in step 508. Note that if it is desired to mandate snooping for device 124 accesses to addresses within the first 4 k of memory address space, then step 510, when writing to the 0'th word of snoop advisory bits, can write a word containing a "1" in the highest order bit.

When the loop 508 completes (step 512), the routine for clearing snoop advisory bits is done (step 514).

In addition to the variations mentioned above, other variations are also possible in the routine to clear snoop advisory bits. As one example, after the loop 502 completes, the routine can execute instructions to invalidate all entries of the data cache. In the host processor 110, this can be done with the mtspr instruction setting, and then clearing, a cache invalidate signal. As another example, useful mainly for larger caches, step 504 could be replaced by instructions which test whether the current cache entry is in the modified state and, only if so, perform a write-back and invalidate operation. If not, only an invalidate operation is performed.

III. VARIATIONS

In addition to the above-described embodiment, and the several variations already mentioned above, several other variations will now be mentioned. All are considered to be within the scope of the invention.

As previously mentioned, the values stored in the snoop advisory bit cell array are only advisory. A "snoop no" value indicates that referenced address is definitely not cached in the processor 110, but a "snoop yes" value indicates only that so far as the snoop advisory module 140 has been able to discern, the referenced address may be cached in the processor 110. The device 124 responds to all "snoop yes" advisories by initiating a snoop operation, but in another embodiment, the device 124 may decide for its own reasons that the snoop is nevertheless unnecessary.

There are at least three senses in which a "snoop yes" value in the snoop advisory cell is only advisory. In one sense, it is advisory because each cell corresponds to an entire snoop advisory page of the memory address space, whereas the read access in response to which the snoop advisory module set an advisory cell, covered only one cache line in the memory address space. Thus a given snoop advisory cell will indicate "snoop yes" for any device accesses to any address in a 16 k or 32 k byte address range, even though the only indication that the snoop advisory module had that data may now be stored in the cache, concerned only 32 bytes of that 16 k or 32 k byte range.

In a different embodiment, this source of uncertainty in the "snoop yes" value can be reduced by reducing the snoop advisory page size. Any reduction in uncertainty in the "snoop yes" value can improve performance by reducing the number of unnecessary snoop cycles. In the extreme, this source of uncertainty can be eliminated entirely by implementing a snoop advisory page size equal to the line size of the processor 110 internal cache (32 bytes). Any reduction in the snoop advisory page size, however, would have to be weighed against the increased cost of a proportionally increased number of snoop advisory bit cells, or a reduction in the range of memory address space which is shareable, or a combination of both. In this connection, it is noteworthy that the snpAdv8meg bit in the above-described embodiment allows a programmable tradeoff between a 16 k snoop advisory page size with a 4-megabyte shareable memory address space on the one hand, and a 32 k snoop advisory page size with an 8-megabyte shareable memory address space on the other hand. Both options use the same snoop advisory bit array size of 256 bit cells.

A second sense in which a "snoop yes" value is only advisory, derives from imprecision in the ability of the snoop advisory module to determine whether a given processor-initiated read transaction constitutes a cache line fill. The embodiment described herein always errs on the side of overincluding rather than underincluding, but it is quite possible that the snoop advisory module will mark a given snoop advisory cell "snoop yes", in response to a processor-originated read transaction which did not actually fill a line of the processor's internal cache. In a given embodiment, the ability to design host bus monitoring logic which minimizes this source of uncertainty in a "snoop yes" value, will depend on the processor chosen for the design and the information which the processor provides to external circuitry about the transactions that it initiates.

A third sense in which a "snoop yes" value is only advisory, derives from the fact that data from a given line of memory may not actually remain cached for very long. After a cache line fill transaction, detected by the snoop advisory module and flagged in the appropriate snoop advisory bit cell, the processor may subsequently perform other cache line fills which replace the data in the cache line. Or the processor may for some reason invalidate the cache line. In either case the snoop advisory cell will continue to indicate a "snoop yes" value, even though the data which the processor read, and which caused the "snoop yes" value, is no longer in the cache.

The embodiment described herein limits this source of "snoop yes" uncertainty by clearing the cache and the snoop advisory bits at a periodic rate. In another embodiment, this rate may be increased, thereby reducing the uncertainty from this source and improving the performance of the external devices. However, any increase in this rate typically would have to be weighed against the performance degradation which would likely be experienced by the host processor from having to perform cache and snoop advisory cell clearing processes proportionally more often.

In yet another embodiment, the snoop advisory module could monitor the host bus traffic for indications that a data line is no longer cached in the processor internal cache. Such indications can come in part from the transaction type signals asserted by the processor, for example. As another example, immediately after an external device (external to the processor structure) has written to or read from every cache-line-sized region in a given area of memory, the snoop advisory module knows that data in the given area of memory has no possibility of being cached. Whenever the snoop advisory module determines with certainty that the cache is no longer caching any data from a given snoop advisory page, the module can clear the corresponding snoop advisory cell. Such an embodiment may require a significant amount of additional circuitry, however, and further requires a processor which provides to external circuitry sufficient information about processor-originated transactions to enable such determinations.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. A method for managing snoop requests to a processor structure which accesses data in a memory structure external to said processor structure, said memory structure having a first address space and said processor structure including a cache memory for caching data of said first address space for said processor structure, for use with an additional device which also accesses data in said first address space of said memory structure, and for use further with a first snoop advisory cell corresponding to a first subset of addresses in said first address space, comprising the steps of:

monitoring transactions originated by said processor structure, and in response to each such transaction which, according to a predetermined monitoring test, indicates that data from said first subset of addresses in said first address space may be newly cached in said processor structure, writing a "snoop yes" value into said first snoop advisory cell;

in response to each particular access by said additional device to an address which is within said first subset of addresses in said first address space, issuing a snoop request to said processor structure for the address of said particular access if said first snoop advisory cell contains said "snoop yes" value, and if said first snoop advisory cell does not contain said "snoop yes" value, accessing said memory structure without issuing said snoop request; and recurrently performing the following steps in conjunction with each other:
synchronizing with said memory structure all data of said first subset of addresses which is cached in said cache memory, and
writing a "snoop no" value into said first snoop advisory cell.

2. A method according to claim 1, wherein said step of recurrently performing specified steps in conjunction with each other comprises the step of recurrently causing said processor structure to perform said specified steps in conjunction with each other in response to software instructions executing in said processor structure.

3. A method according to claim 1, wherein. said predetermined monitoring test tests for a read access by said processor structure which is of a predetermined type and which is to an address which is within said first subset of addresses in said first address space.

4. A method according to claim 3, wherein said cache memory includes an instruction cache memory and a data cache memory, and wherein said predetermined type of read access includes all read accesses by said processor structure for filling a line of said data cache memory with intent to modify said line of said data cache memory.

5. A method for managing snoop requests to a processor structure which accesses data in a memory structure external to said processor structure, said memory structure having a first address space and said processor structure including a cache memory for caching data of said first address space for said processor structure, for use with an additional device which also accesses data in said first address space of said memory structure, and for use further with a first snoop advisory cell, comprising the steps of:

in response to each read access by said processor structure, determining if said read access is to an address which is within a first subset of addresses in said first address space, and if said read access is of a predetermined type, writing a "snoop yes" value into said first snoop advisory cell;

in response to each particular access by said additional device to an address which is within said first subset of addresses in said first address space, issuing a snoop request to said processor structure for the address of said particular access if said first snoop advisory cell contains said "snoop yes" value, and if said first snoop advisory cell does not contain said "snoop yes" value, accessing said memory structure without issuing said snoop request; and recurrently performing the following steps in conjunction with each other:

causing said processor structure to synchronize with said memory structure all data of said first subset of addresses which is cached in said cache memory, and writing a "snoop no" value into said first snoop advisory cell.

6. A method according to claim 5, wherein said first subset of addresses in said first address space covers a contiguous range of data locations in said memory structure.

7. A method according to claim 5, wherein said cache memory includes an instruction cache memory and a data cache memory, and wherein said predetermined type of read access excludes all read accesses by said processor structure for filling a line of said instruction cache memory.

8. A method according to claim 5, wherein said cache memory includes an instruction cache memory and a data cache memory, and wherein said predetermined type of read access includes all read accesses by said processor structure for filling a line of said data cache memory with intent to modify said line of said data cache memory.

9. A method according to claim 5, wherein said recurrently performed steps are performed periodically.

10. A method according to claim 5, for use further with a video display, and circuitry which refreshes said display in response to information in said memory structure at a periodic refresh rate, and wherein said recurrently performed steps are performed in conjunction with each of said refreshes of said video display.

11. A method according to claim 5, wherein said cache memory follows a write-through cache coherency protocol within said first subset of addresses, and wherein said step of causing said processor structure to synchronize with said memory structure all data of said first subset of addresses which is cached in said cache memory, comprises the step of causing said processor structure to invalidate in said cache memory all data of said first subset of addresses which is cached in said cache memory.

12. A method according to claim 5, wherein said processor structure also accesses data in an I/O address space distinct from said first address space, wherein said first snoop advisory cell comprises a bit cell in a register addressable by said processor structure in said I/O address space, and wherein said step of writing a "snoop no" value into said first snoop advisory cell comprises the step of said processor structure writing said "snoop no" value into said first snoop advisory cell. under control of software instructions executing in said processor structure.

13. A method according to claim 5, for use further with a second snoop advisory cell corresponding to a second subset of addresses in said first address space, said second subset of addresses being distinct from said first subset of addresses, further comprising the steps of:

in response to each read access by said processor structure, determining if said read access is to an address which is within said second subset of addresses in said first address space, and if said read address is of said predetermined type, writing said "snoop yes" value into said second snoop advisory cell;

in response to each detected access by said additional device to an address which is within said second subset of addresses in said first address space, issuing a snoop request to said processor structure for the address of said detected access if said second snoop advisory cell contains said "snoop yes" value, and if said second snoop advisory cell does not contain said "snoop yes" value, accessing said memory structure without issuing said snoop request; and recurrently performing the following steps in conjunction with each other:

causing said processor structure to synchronize with said memory structure all data of said second subset of addresses which is cached in said cache memory, and writing a "snoop no" value into said second snoop advisory cell.

14. A method according to claim 5, wherein said cache memory follows a write-back cache coherency protocol within said first subset of addresses, and wherein said step of causing said processor structure to synchronize with said memory structure all data of said first subset of addresses which is cached in said cache memory, comprises the step of causing said processor structure to write back to said memory structure all data of said first subset of addresses which is cached and modified in said cache memory.

15. A method according to claim 14, wherein said step of causing said processor structure to synchronize with said memory structure all data of said first subset of addresses which is cached in said cache memory, further comprises the step of causing said processor structure to invalidate in said cache memory all data of said first subset of addresses which is cached in said cache memory.

16. A method for managing snoop requests to a processor structure which accesses data in a memory structure external to said processor structure, said memory structure having a first address space and said processor structure including a cache memory for caching data of said first address space for said processor structure, for use with an additional device which also accesses data in said first address space of said memory structure, and for use further with a plurality of snoop advisory cells, each corresponding to a respective distinct subset of said first address space, comprising the steps of:

response to a first read access by said processor structure, determining if said first read access is a first address which is within a first subset of addresses in said first address space, and if said first read access is of a predetermined type, writing a "snoop yes" value into the a first snoop advisory cell corresponding to said first subset of addresses;

in response to a second access by said additional device, determining if said second access is to a second address which is within a second subset of addresses in said first address space, and issuing a snoop request to said processor structure for said second address if a second snoop advisory cell corresponding to said second subset contains said "snoop yes" value, and if said second snoop advisory cell does not contain said "snoop yes" value, accessing said memory structure without issuing said snoop request; and recurrently performing the following steps in conjunction with each other:
causing said processor structure to synchronize with said memory structure all data of each of said subsets of addresses which is cached in said cache memory, and
writing "snoop no" values into each of said snoop advisory cells.

17. A method according to claim 16, wherein each of said subsets of said first address space covers a contiguous range of data locations in said memory structure.

18. A method according to claim 16, wherein said recurrently performed steps are performed periodically.

19. A method according to claim 16, wherein said cache memory follows a write-through cache coherency protocol within each of said subsets of addresses,
and wherein said step of causing said processor structure to synchronize with said memory structure all data of each of said subsets of addresses which is cached in said cache memory, comprises the step of causing said processor structure to invalidate in said cache memory all data of each of said subsets of addresses which is cached in said cache memory.

20. A method according to claim 16, wherein said processor structure also accesses data in an I/O address space distinct from said first address space, said snoop advisory cells comprising respective bit cells in registers addressable by said processor structure in said I/O address space, and wherein said step of writing "snoop no" values into each of said snoop advisory cells comprises the step of said processor structure writing said "snoop no" values into each of said snoop advisory cells under control of software instructions executing in said processor structure.

21. A method according to claim 16, wherein said cache memory follows a write-through cache coherency protocol within a given subset of addresses,
and wherein said step of causing said processor structure to synchronize with said memory structure all data of said given subset of addresses which is cached in said cache memory, comprises the step of causing said processor structure to invalidate in said cache memory all data of said given subset of addresses which is cached in said cache memory.

22. A method according to claim 16, wherein said cache memory includes an instruction cache memory and a data cache memory, and wherein said predetermined type of read access includes all read accesses by said processor structure for filling a line of said data cache memory.

23. A method according to claim 16, wherein said cache memory includes an instruction cache memory and a data cache memory, and wherein said predetermined type of read access includes all read accesses by said processor structure for filling a line of said data cache memory with intent to modify said line of said data cache memory.

24. A method according to claim 16, wherein said cache memory has a cache line size, wherein the step of writing "snoop no" values into each of said snoop advisory cells further comprises writing "snoop no" values into a given one of said snoop advisory cells in response to a write access by said additional device which writes data into each cache-line-sized memory region which is within the subset of said first address space corresponding to said given snoop advisory cell.

25. A method according to claim 16, wherein said cache memory follows a write-back cache coherency protocol within at least one of said subsets of addresses,
and wherein said step of causing said processor structure to synchronize with said memory structure all data of each of said subsets of addresses which is cached in said cache memory, comprises the step of causing said processor structure to write back to said memory structure all data of each of said subsets of addresses which is cached and modified in said cache memory.

26. A method according to claim 25, wherein said step of causing said processor structure to synchronize with said memory structure all data of each of said subsets of addresses which is cached in said cache memory, further comprises the step of causing said processor structure to invalidate in said cache memory all data of each of said subsets of addresses which is cached in said cache memory.

27. A method according to claim 16, wherein said cache memory follows a write-back cache coherency protocol at least within a given subset of addresses,
and wherein said step of causing said processor structure to synchronize with said memory structure all data of said given subset of addresses which is cached in said cache memory, comprises the step of causing said processor structure to write back to said memory structure all data of said given subset of addresses which is cached and modified in said cache memory.

28. A method according to claim 27, wherein said step of causing said processor structure to synchronize with said memory structure all data of said given subset of addresses which is cached in said cache memory, further comprises the step of causing said processor structure to invalidate in said cache memory all data of said given subset of addresses which is cached in said cache memory.

29. Snoop request management apparatus, for use with a memory structure and a processor structure which accesses data in said memory structure, said memory structure having a first address space and said processor structure including a cache memory for caching data of said first address space for said processor structure, for use with an additional device which also accesses data in said first address space of said memory structure, comprising:

a first snoop advisory cell;

processor monitoring circuitry coupled to said processor structure and to said first snoop advisory cell, said processor monitoring circuitry, in response to each given read access by said processor structure, determining if said given read access is to an address which is within a first subset of addresses in said first address space, and if said given read access is of a predetermined type, writing a "snoop yes" value into said first snoop advisory cell;

clearing circuitry coupled to said first snoop advisory cell, said clearing circuitry writing a "snoop no" value into said first snoop advisory cell at predetermined times; and snoop decision circuitry coupled to said first snoop advisory cell and further coupled to detect accesses by said additional device, said snoop decision circuitry having a snoop decision output and, in response to each particular access by said additional device to an address which is within said first subset of addresses in said first address space, asserting a "snoop necessary" value on said snoop decision output if said first snoop advisory cell contains said "snoop yes" value and asserting a "snoop unnecessary" value on said snoop decision output if said first snoop advisory cell does not contain said "snoop yes" value.

30. Apparatus according to claim 29, further comprising snoop issuing circuitry coupled to said processor structure, which issues a snoop request to said processor structure for the address of said particular access in response to each assertion by said snoop decision circuitry of said "snoop necessary" value.

31. Apparatus according to claim 29, wherein said cache memory includes an instruction cache memory and a data cache memory, and wherein said predetermined type of read access includes all read accesses by said processor structure for filling a line of said data cache memory with intent to modify said line of said data cache memory.

32. Apparatus according to claim 29, for use further with a video display, further comprising circuitry which refreshes said display in response to information in said memory structure at a periodic refresh rate, said predetermined times occurring in conjunction with each of said refreshes of said video display.

33. Apparatus according to claim 29, further comprising a second snoop advisory cell corresponding to a second subset of addresses in said first address space, said second subset of addresses being distinct from said first subset of addresses, said processor monitoring circuitry being coupled further to said second snoop advisory cell and, in response to each identified read access by said processor structure, determining if said identified read access is to an address which is within said second subset of addresses in said first address space, and if said given read access is of said predetermined type, writing said "snoop yes" value into said second snoop advisory cell;

said clearing circuitry being coupled further to said second snoop advisory cell, said clearing circuitry further writing said "snoop no" value into said second snoop advisory cell at predetermined times; and said snoop decision circuitry being coupled further to said second snoop advisory cell, said snoop decision circuitry further in response to each detected access by said additional device to an address which is within said second subset of addresses in said first address space, asserting said "snoop necessary" value on said snoop decision output if said second snoop advisory cell contains said "snoop yes" value and asserting said "snoop unnecessary" value on said snoop decision output if said second snoop advisory cell does not contain said "snoop yes" value.

34. Apparatus according to claim 29, wherein said first snoop advisory cell is writable by said processor structure, and wherein said clearing circuitry comprises circuitry coupled to said processor structure and to said first snoop advisory cell which detects write accesses by said processor structure to said first snoop advisory cell, and which in response thereto, writes into said first snoop advisory cell a value specified by said processor structure.

35. Apparatus according to claim 34, wherein said memory structure includes software instructions which, when executed by said processor structure, perform a write access to said first snoop advisory cell specifying said "snoop no" value.

36. Snoop request management apparatus, for use with a memory structure and a processor structure which accesses data in said memory structure, said memory structure having a first address space and said processor structure including a cache memory for caching data of said first address space for said processor structure, said cache memory having a plurality of entries, for use with an additional device which also accesses data in said first address space of said memory structure, comprising:

a plurality of snoop advisory cells, each corresponding to a respective distinct subset of addresses in said first address space;

setting circuitry coupled to said snoop advisory cells and further coupled to detect a first read access indicating, according to a first predetermined test, that at least one of said cache memory entries may now be mapped to an address which is within a first subset of addresses said setting circuitry writing a "snoop yes" value into a first snoop advisory cell corresponding to said first subset of addresses in response to the first read access;

clearing circuitry coupled to said snoop advisory cells, and further coupled to detect a second occurrence indicating, according to a second predetermined test, that none of said cache memory entries remain mapped to an address which is within a second subset of addresses, said clearing circuitry writing a "snoop no" value into a second snoop advisory cell corresponding to said second subset of addresses in response to said second occurrences; and snoop decision circuitry coupled to said snoop advisory cells and further coupled to detect accesses by said additional device, said snoop decision circuitry having a snoop decision output and, in response to a third access by said additional device to a third address which is within a third subset in said first address space, asserting a "snoop advised" value on said snoop decision output if a third snoop advisory cell corresponding to said third subset of addresses contains said "snoop yes" value and asserting a "snoop unnecessary" value on said snoop decision output if said third snoop advisory cell does not contain said "snoop yes" value.

37. Apparatus according to claim 36, wherein for said first predetermined test, said setting circuitry detects all read accesses by said processor structure which are of a predetermined type, said predetermined type of read accesses including all read accesses by said processor structure for filling a line of said cache memory.

38. Apparatus according to claim 36, further comprising, in said memory structure, software instructions which, when executed by said processor structure, periodically cause said processor structure to synchronize with said memory structure all data of each of said subsets of addresses which is cached in said cache memory, and further cause said processor structure to provide signals to said clearing circuitry indicating that said processor structure has done so, wherein for said second predetermined test, said cell clearing circuitry detects said signals provided by said processor structure.

39. Apparatus according to claim 36, wherein said cache memory has a cache line size, and wherein said second subset of addresses in said memory structure consists of a plurality of cache-line-sized data areas, for use further with a further device which also accesses data in said first address space of said memory structure, wherein for said second predetermined test, said clearing circuitry detects all write accesses by said further device which writes to at least one byte in each of said cache-line-sized areas of said memory structure.

40. Apparatus according to claim 36, further comprising snoop issuing circuitry coupled to said processor structure, which issues a snoop request to said processor structure for the address of said third access in response to each assertion by said snoop decision circuitry of said "snoop advised" value.

41. Apparatus according to claim 36, further comprising, in said memory structure, software instructions which, when executed by said processor structure, recurrently cause said processor structure to synchronize with said memory structure all data of said second subset of addresses which is cached in said cache memory, and further cause said processor structure to provide signals to said clearing circuitry indicating that said processor structure has done so, wherein for said second predetermined test, said clearing circuitry detects said signals provided by said processor structure.

42. Apparatus according to claim 41, wherein said cache memory follows a write-through cache coherency protocol within each of said subsets of addresses, and wherein said synchronizing with said memory structure all data of said second subset of addresses which is cached in said cache memory comprises invalidating data of said second subset of addresses which is cached in said cache memory.

43. Apparatus according to claim 41, wherein said cache memory follows a write-back cache coherency protocol within at least one of said subsets of addresses, and wherein said synchronization with said memory structure all data of said second subset of addresses which is cached in said cache memory comprises writing back to said memory structure all data of said second subset of addresses which is cached and modified in said cache memory.

44. Apparatus according to claim 43, wherein said synchronizing with said memory structure all data of said second subset of addresses which is cached in said cache memory further comprises invalidating all data of said second subset of addresses which is cached in said cache memory.

* * * * *

UNITED STATES PATENT AND TRADEMARK OFFICE
CERTIFICATE OF CORRECTION

PATENT NO. : 5,860,114

DATED : January 12, 1999

INVENTOR(S) : John V. Sell

It is certified that error appears in the above-identified patent and that said Letters Patent is hereby corrected as shown below:

Column 19, line 46, after "said" insert --video--.

Column 20, line 60, insert --in--before "response".

Column 23, line 23, after "said" and before "display" insert --video--.

Column 26, line 3, after "invalidating" insert --all--.

Signed and Sealed this

Eighteenth Day of May, 1999

*Attest:*

Q. TODD DICKINSON

*Attesting Officer*     Acting Commissioner of Patents and Trademarks